March 14, 1950 F. KERKHOF 2,500,831

CIRCUIT-ARRANGEMENT FOR AMPLIFYING IMAGE SIGNALS AND SYNCHRONIZING SIGNALS

Filed Oct. 18, 1946

INVENTOR
FREDERIK KERKHOF
BY [signature]
AGENT

Patented Mar. 14, 1950 2,500,831

UNITED STATES PATENT OFFICE 2,500,831

CIRCUIT ARRANGEMENT FOR AMPLIFYING IMAGE SIGNALS AND SYNCHRONIZING SIGNALS

Frederik Kerkhof, Eindhoven, Netherlands, assignor to Hartford National Bank and Trust Company, Hartford, Conn., a trustee Application October 18, 1946, Serial No. 704,133
In the Netherlands August 8, 1945

Section 1, Public Law 690, August 8, 1946
Patent expires August 8, 1965

3 Claims. (Cl. 179—171)

Figure 1:
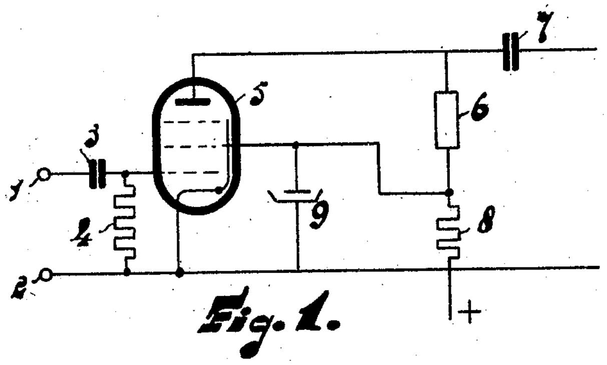

In television receivers in which the images are reproduced by means of a cathode-ray tube it is common practice to supply both the image signal and the synchronising signals to the control electrode of the reproducing tube in such manner that the control electrode is rendered less negative by the image signal and more negative by the synchronising signals. If the image and synchronising signals for the control of the reproducing tube are derived from a preceding amplifying tube, this implies, in view of the fact that the polarity of the amplified voltage in the anode circuit is inverse to that of the non-amplified voltage in the control-grid circuit, that the image and synchronising signals have to be applied with inverse polarities to the control grid of the amplifying tube, that is to say, the control grid must become more negative during the image signal and less negative during the synchronising signal.

In this case it is advantageous to give the control grid of the amplifying tube only a small negative bias, in order to enable the image signal to control the maximum possible portion of the anode current control-grid voltage characteristic. This has the drawback, however, that when image and synchronising signals are absent the amplifying tube draws a large anode current and that there is a risk of the energy absorbed by the tube being greater than the permissible dissipation which may result in damage to the tube. In order to be certain that this is prevented under all conditions it is possible to operate the amplifying tube, in most cases a pentode tube, at low anode and screen-grid voltages, in which event the maximum permissible energy dissipated by the tube is drawn in the absence of any signal. This has, however, the drawback that a decrease of the anode and screen-grid voltages would have the effect of reducing the controllable portion of the anode current- control-grid voltage characteristic while, as mentioned before, the aim is, on the contrary, to make this portion as large as possible.

In amplifiers in which the signal voltage active between the control grid and a cathode comprises the direct-current component corresponding to the mean brightness of the image to be reproduced, these drawbacks are met by the invention owing to the fact that the conductor common to the anode and the screen grid and through which the direct-current voltages are supplied to the anode and the screen grid includes a resistance of such a value that in the absence of any signal the maximum permissible dissipation of the amplifying tube is attained.

When the signal voltage active between the control grid and the cathode comprises the direct-current component corresponding to the mean brightness of the image, the direct-current component increases with an increase in the amplitude of the image signal with the result that the control grid becomes more negative and the direct-current components of the anode and screen-grid currents decrease. Consequently, the voltage drop across the resistance included in the common supply conductor for the anode and the screen grid decreases, so that the anode and screen grid voltages increase and a steadily increasing portion of the characteristic becomes available for control without the permissible dissipation being exceeded.

There is no need for the signal supplied to the control-grid circuit to comprise the direct-current component corresponding to the mean brightness of the image. It is only necessary that the signal voltage active between the control grid and the cathode comprise this component. The direct-current component will be absent, for example, when the terminal amplifying tube is preceded by an alternating-current amplifier. This direct-current component can, however, be re-obtained in known manner by including a grid condenser and a leak resistance in the control-grid circuit of the terminal rectifying tube and by giving the tube no grid-bias or so small a negative grid-bias that grid current can flow during the synchronising impulses and the grid-cathode space in conjunction with the grid condenser and the leak resistance serves as a peak detector. The signal voltage active between the control grid and the cathode comprises in this case a direct-current component corresponding to the mean brightness of the image, as is required for the operation of the circuit according to the invention.

The invention will be explained more fully by reference to the accompanying drawing showing, by way of example, one form of a circuit according to the invention.

The image signal and the synchronising signals are applied to input terminals 1, 2 and control, via a grid capacitor 3 and a grid-leak resistor 4, the control grid of an amplifying tube 5. The anode circuit thereof includes an impedance 6 from which the amplified image and synchronising signals are derived and applied, via a capacitor 7, to the control electrode of a reproducing tube which is not shown. The conductor through which the direct voltages for the anode and the screen grid are supplied includes a resistor 8 shunted by a capacitor 9.

It is assumed that the signal supplied to the input terminals 1, 2 does not comprise the direct-current component corresponding to the mean brightness of the image and that the signal is applied between grid and cathode of the amplifying tube 5 with such polarity that the grid becomes negative during the image signal and positive during the synchronising signals. During the latter a grid current flows which charges the capacitor 3 to such a voltage that the peaks of the synchronising signals lie substantially at the same height and that the grid takes a but small positive voltage during the synchronising pulses. The signal active between the control grid and the cathode comprises a direct-current component the magnitude of which corresponds to the mean brightness of the image. This method of re-obtaining the direct-current component is known so that there is no need to describe it here more fully.

Figure 2:
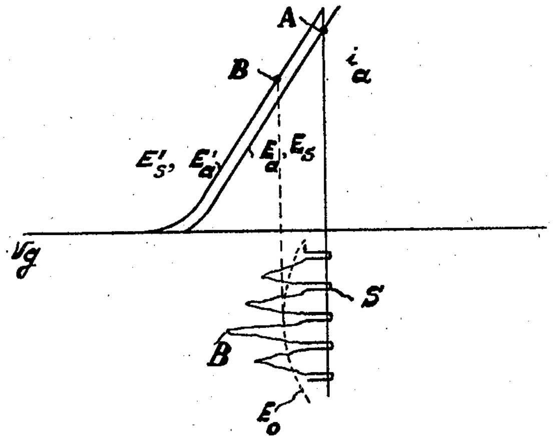

Figure 2 shows the anode current as a function of the grid voltage $V_g$. The signal voltage active between the grid and the cathode is constituted by the synchronising pulses S and the image signal B and this signal voltage now comprises a direct-current component which is shown by the dotted curve $E_o$.

The direct voltage serving for the supply of the anode and the screed grid is given such a value that in the absence of the resistor 8 the energy dissipated by the anode and the screen grid exceeds the permissible value. A direct voltage loss is, however, set up across resistor 8 with the result that the anode and screen grid voltages are decreased to such values $E_a$ and $E_s$ that in the absence of a signal in the control grid circuit the permissible dissipation is attained. The working point at the anode current $i_a$—grid voltage $V_g$—characteristic corresponding to the voltages $E_a$ and $E_s$ lies in this case at A. If, now, the signal voltage active between the grid and the cathode has the shape B, as shown in Figure 2 the anode and screen-grid currents decrease upon increase of the direct-current component $E_o$ and as a result of the decreased voltage drop across resistor 8 the anode and screen grid voltages increase at a certain amount for example to the values $E_a'$ and $E_s'$ respectively. In this case the working point is located at point B of the characteristic corresponding to the voltages $E_a'$ and $E_s'$. The controllable part of the characteristic which is available for the image signal B is now larger while the permissible dissipation is not exceeded.

The direct-current component produced in the grid circuit of the amplifying tube 5 is suppressed by the condenser 7. If it is desired to retain it, the condenser 7 must be replaced by direct coupling.

What I claim is:

1. A circuit arrangement to amplify a source of desired signals having image and synchronizing components, comprising a thermionic discharge tube having a cathode, control grid, screen grid and anode, said screen grid and anode having given maximum allowable currents, an output stage, means to couple the said output stage to the anode-cathode circuit of the said thermionic discharge tube, means to apply the said source of desired signals to the grid-cathode circuit of the said thermionic discharge tube, said latter means rendering the control grid more negative during the image component, less negative during the synchronizing component and deriving a direct current bias potential corresponding to the magnitude of the image component of the said desired signals, an impedance element connected in the anode-screen grid circuit of the said thermionic discharge tube, means to supply said screen grid and anode of the said thermionic discharge tube with a source of potential, said latter means comprising a direct current voltage and a resistive element in series with the direct current voltage, and said resistive element having a value at which in the absence of the said source of desired signals the said maximum allowable screen-grid and anode currents flow.

2. In an amplifier for a source of desired signals having image and synchronizing components, a thermionic discharge tube having a cathode, control grid, screen-grid and anode, said screen-grid and anode having given maximum allowable currents, an output stage, means to couple the said output stage to the anode-cathode circuit of the said thermionic discharge tube, means to apply the said source of desired signals to the grid-cathode circuit of the said thermionic discharge tube, said latter means rendering the control grid more negative during the image component, less negative during the synchronizing component, and deriving a direct current bias potential corresponding to the magnitude of the image component of the said desired signals, an impedance element connected in the anode-screen grid circuit of the said thermionic discharge tube, the circuit comprising means to supply said screen grid and anode of the said thermionic discharge tube with a source of potential, said latter means comprising a direct current voltage and a resistive element in series with the direct current voltage, and said resistive element having a value at which in the absence of the said source of desired signals the said maximum allowable screen grid and anode currents flow.

3. A circuit arrangement to amplify a source of desired signals having image and synchronizing components, comprising a thermionic discharge tube having a cathode, control grid, screen-grid and anode, said screen grid and anode having given maximum allowable currents, an output stage, means to couple the said output stage to the anode-cathode circuit of the said thermionic discharge tube, means to apply the said source of desired signals to the grid-cathode circuit of the said thermionic discharge tube, said latter means rendering the control grid more negative during the image component, less negative during the synchronizing component and deriving a direct current bias potential corresponding to the magnitude of the image component of the said desired signals, an impedance element connected in the anode-screen grid circuit of the said thermionic discharge tube, means to supply said screen grid and anode of the said thermionic discharge tube with a source of potential, said latter means comprising a supply voltage, a capacitive element shunting the screen grid-cathode circuit of the said thermionic discharge tube, a resistive element, in series with the supply voltage, and said resistive element having a value at which in the absence of the said source of desired signals the said maximum allowable screen-grid and anode currents flow.

FREDERIK KERKHOF.

REFERENCES CITED

The following references are of record in the file of this patent:

UNITED STATES PATENTS

| Number | Name | Date |
|---|---|---|
| 2,039,113 | Rechnitzer | Apr. 28, 1936 |
| 2,258,370 | Taylor et al. | Oct. 7, 1941 |
| 2,367,357 | Koch | Jan. 16, 1945 |

FOREIGN PATENTS

| Number | Country | Date |
|---|---|---|
| 106,298 | Austria | Dec. 29, 1938 |